United States Patent [19]

Neill et al.

[11] 4,408,343

[45] Oct. 4, 1983

[54] IMAGE ENHANCEMENT FOR OPTICAL CHARACTER READERS

[75] Inventors: Jimmie Neill, Walled Lake; Nathaniel Webb, Detroit; Norman F. Hartig, Berkley, all of Mich.

[73] Assignee: Burroughs Corporation, Detroit, Mich.

[21] Appl. No.: 238,972

[22] Filed: Feb. 27, 1981

[51] Int. Cl.³ .............................................. G06K 9/36
[52] U.S. Cl. ........................................ 382/52; 382/54
[58] Field of Search .......... 340/146.3 AG, 146.3 MA; 382/50, 52, 54; 358/166, 282, 284

[56] References Cited

U.S. PATENT DOCUMENTS

| | | | |
|---|---|---|---|
| 3,484,747 | 12/1969 | Nunley | 340/146.3 AG |
| 3,737,855 | 6/1973 | Cutaia | 340/146.3 AG |
| 3,761,876 | 9/1973 | Flaherty et al. | 340/146.3 AG |
| 3,944,977 | 3/1976 | Holmes et al. | 340/146.3 AG |
| 4,047,152 | 9/1977 | Guiliano et al. | 340/146.3 AG |
| 4,162,481 | 7/1979 | Duvall | 340/146.3 AG |

Primary Examiner—Leo H. Boudreau
Attorney, Agent, or Firm—Delbert P. Warner; Kevin R. Peterson

[57] ABSTRACT

A system is shown for enhancing signals produced by the scanning components of an optical character reader. Analog video signals produced by a scanner are converted to digital video signals representing a plurality of pixels. Digital video signals representing a matrix of pixels where the matrix is smaller than the individual characters are summed together to provide a reference base of brightness. A digital video signal located at the center of the matrix of interest is scaled to a value corresponding to the number of pixels in the matrix times its brightness level. The scaled center signal is then compared with the summed signals. The scaled center signal is made to read "white" if it is brighter than the summed signals and made to read "black" if it is darker than the summed signals.

9 Claims, 3 Drawing Figures

IMAGE ENHANCEMENT FOR OPTICAL CHARACTER READERS

BACKGROUND OF THE INVENTION

1. Field of the Invention

The present invention relates to optical character readers and to the processing of signals, such as video signals, produced by an image scanner of a character reader as the face of a document passes by. More particularly, the invention relates to a system for processing video signals from a scanner in a manner which enhances the signals so that they more accurately represent characters being read from the document.

2. Description of the Prior Art

Exemplary prior art relating to signal processors for improving the performance of optical scanners may be found in patents which have issued in the United States.

Among these United States patents are U.S. Pat. No. 4,162,481 to Du Vall which issued on July 24, 1979. Du Vall discloses a technique which resembles, in part, that of the present invention; but, he uses his apparatus to determine when an improper reference background exists and then alters parameters to correct for the background. The method and apparatus for enhancing images according to the present invention are patentably distinct over Du Vall in that enhancement is directed to an individual pixel of a character relative to a matrix of pixels of the character rather than to improvement against the background as such. In addition to the foregoing distinctions, the apparatus employed and the procedures followed in attaining the results of the present invention are different and are patentably distinct over those shown by Du Vall.

Other U.S. patents which are of interest are U.S. Pat. No. 3,747,066 to Vernot which issued on July 17, 1973 and U.S. Pat. No. 4,119,947 to Leighton, et al which issued on Oct. 10, 1978. Each of these patents relates to signal processors for optical scanners which embody the idea of comparing a small area with a larger surrounding area with the object of generating signals to help identify part of a printed character or other pattern. Neither anticipates the present invention as set forth in the claims.

The broad idea of comparing the brightness of a small portion of a scanned document to the brightness of an ambient gray area around that portion to provide a basis for correcting or enhancing signals relating to a character being scanned is shown in the literature. Reference may be made to the IEEE Transactions on Computers for February, 1974 entitled "Black-White Representation of a Gray-Scale Picture". The present invention, as claimed, is believed to distinguish patentably over that reference.

BRIEF SUMMARY OF THE INVENTION

A system is provided for optically scanning characters on a printed document, converting the resulting analog video signals into digital video signals and processing the digital video signals to provide enhanced digital video output signals.

Processing includes storing the digital video signals in a random access memory where a group of four bits, referred to herein as a pixel, represents relative brightness or reflectance at a point in the area being studied. A comparison is then made between a pixel representing the scaled reflectance of the central point in a given matrix, or matrix of interest, formed of pixels and signals representing the summed reflectance of all the pixels in that matrix, where the scaled reflectance of the central pixel represents that reflectance times the number of pixels in the matrix. If the scaled reflectance of the center point or pixel is greater by a preset amount than the summed reflectances of the pixels in the matrix, the processor considers the center to be white. Similarly, if the scaled reflectance of the center point or pixel is less than the summed reflectances of the pixels in the matrix by a preset amount the point is called black. The effect of the foregoing binary decision is to increase the emphasis between signals representing black and white so that, as the signals are read out of the present apparatus, they are better suited for further processing in character recognition apparatus.

The foregoing enhancement of signals can be interpreted in terms of the characters represented. In this sense, the effect of processing signals in this manner (which may be referred to as a digital Laplacian technique) is to increase the contrast between light and dark portions of characters. The effect is to lighten the center of characters such as "0" or the loops in "8", which may include undesired spots of ink or dirt, and to darken parts of characters, such as points along a line forming part of a character.

DESCRIPTION OF A PREFERRED EMBODIMENT

Figure 1:
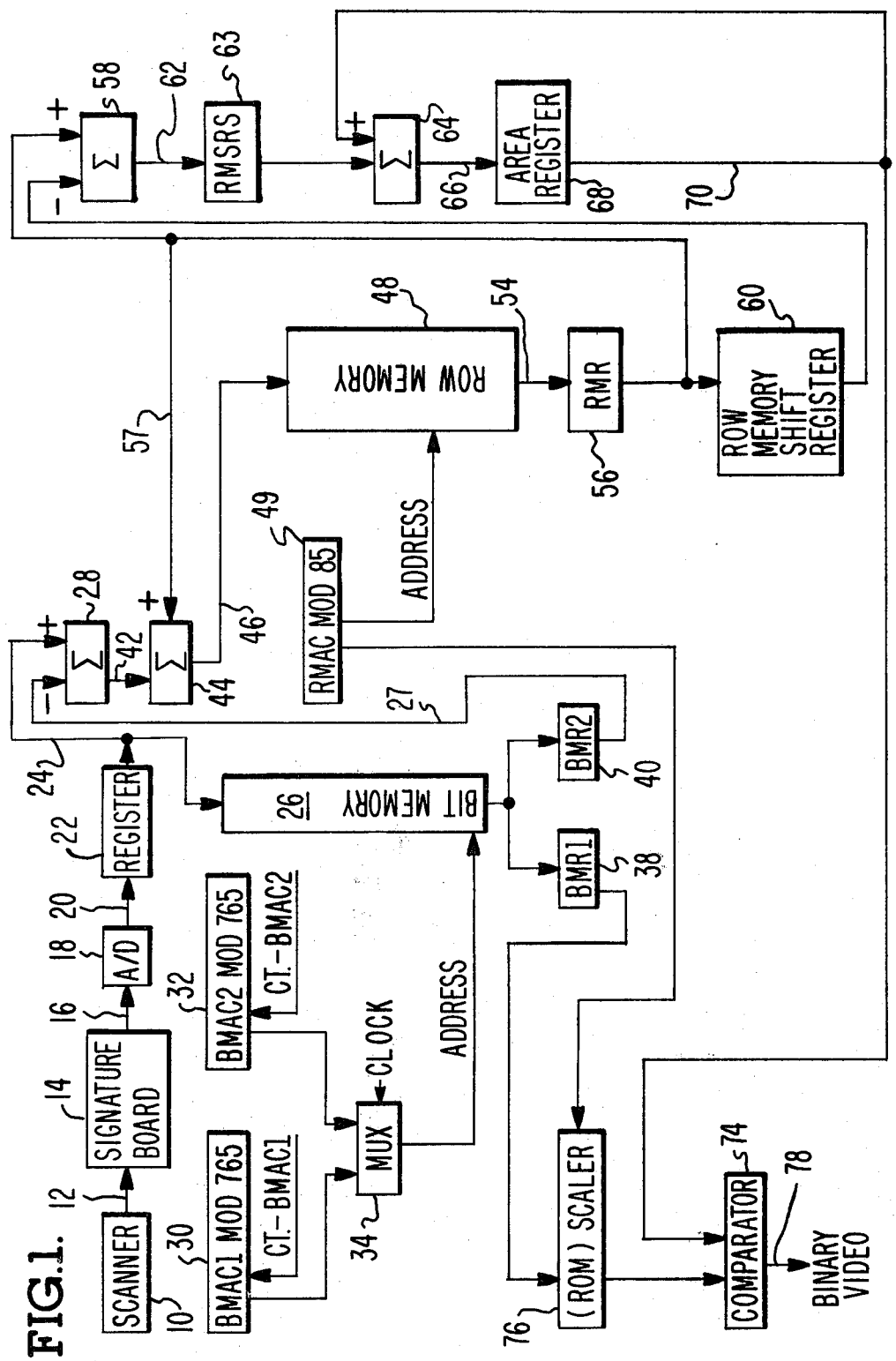
FIG. 1 is a block diagram showing an arrangement for providing enhanced signals according to the invention.

Turning to FIG. 1, a solid state line scanner incorporating a diode array is identified by block 10. This scanner, in a preferred embodiment, may be an RL128L (or an RL64EL if less resolution is permissable) solid state scanner such as those produced by Reticon Corp. of Sunnyvale, California. The scanner produces analog video signals based on samples taken from each of the diodes in sequence, where odd and even diodes are scanned separately giving rise to two trains of pulses which, for the sake of simplicity in the discussion, are referred to as a single train herein. These analog video signals are supplied, together with background noise, over a line 12 to a signature board at 14 where much of the background noise is filtered out. The analog video signals are then applied over line 16 to the analog-to-digital converter at 18. The converter 18 converts the analog video to digital video, where four bits, or a byte, represents a point, or pixel, on the board. Brightness or reflectance will thus vary from 0000 to 1111, where 0000 represents high reflectance, or white, and 1111 represents low reflectance, or black.

The digital video is then supplied over four lines in parallel, forming a bus, at 20, to a four bit register 22 and a bus 24 for storage in a RAM, referred to herein as a bit memory, at 26 and for processing in a summing circuit at 28. In a preferred embodiment, the bit memory is made up of 4 RAMs each of which has a capacity for 1024 bits. This memory serves as a reservoir for data past and present which is to be operated upon. The data, in a preferred embodiment employing 80 diodes in a scanner, amounts to nine columns of 85 data bits for a total of 765 bits per RAM. In a preferred embodiment the signature board 14 would include circuits for improving the characteristics of signals from the scanner in a manner such as that disclosed in copending U.S. Pat. application No. 35,993, filed May 9, 1979 in the name of Pepe Siy, entitled "Adaptive OCR Front End Systems" and assigned to the same assignee as the present application. Said application is hereby incorporated by reference. The A/D converter 18 would be conventional, the register 22 would be an SN74175, the RAM at 26 could include four 93415's operating in parallel and the summing circuit 28 would be a four bit adder such as an SN74283.

Control signals are supplied to the system from a clock source, which is not shown. The basic clock frequency in a preferred embodiment is 41.84 MHz. The clock employs a frequency generator, flip-flops, gates, invertors, multiplexers and other elements in a conventional way to provide control signals.

Access to the bit memory 26 is provided by the Bit Memory Address Counters BMAC1 at 30 and BMAC2 at 32, which both may be 74S163's. These counters provide address information through a multiplexer at 34, which may be a 74S157. The multiplexer is synchronized by clock pulses to enable transmission of signals from the appropriate address counter. Address Counter 30 is set to provide the address to the center point of a sample group of points, which preferably will be the center of a $9 \times 9$ matrix of points, or pixels, such as are indicated in the area bounded by lines L1, L2, L3 and L4 in FIG. 3, where the center would be the pixel at C2. Address counter 32 allows updated data to be loaded into the bit memory 26 after it reads out data that was entered nine scans before. It will be seen that nine scans are required to provide a complete sample of the nine rows employed in the $9 \times 9$ matrix.

Figure 3:
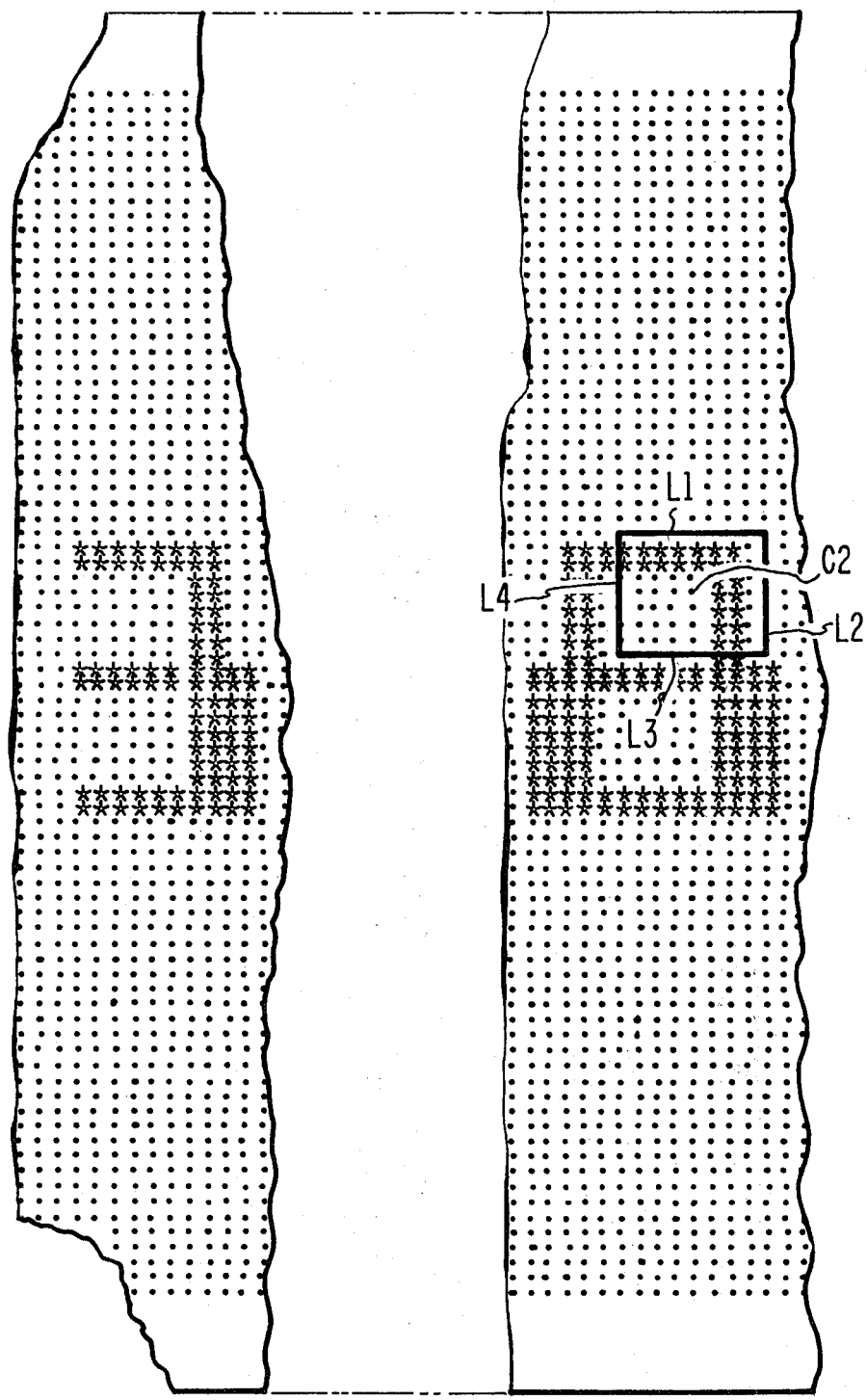
FIG. 3 is an example of a printed read out to show relationships between character size, the length of an exemplary scan by a scanner and an exemplary matrix of pixels.

In a preferred embodiment, the address counter 32 will read out a plurality of signals consisting of four bits, identifying a point or pixel from a matrix or group of points such as the 81 points, or pixels, included within the lines L1, L2, L3 and L4 in FIG. 3. The values read out will represent the oldest information contained in the memory, i.e. the four bit memory of the oldest pixel. This information will be routed for storage temporarily in a Bit Memory Register, or latch, BMR2, which is labeled 40. The address counter 30 will read out an address identifying the central pixel of the $9 \times 9$ array under consideration at that moment and the corresponding four bits of information will be read into the Bit Memory Register, or latch, BMR1 which is labeled 38. Latches 38 and 40 may comprise flip-flop circuits such as SN74175's which include four flip-flops for receiving and storing four bits of information in parallel. As identified above, register 38 will store bits representing the central pixel of the matrix of interest while 40 will contain bits representing the oldest pixel in the matrix of interest. The term "matrix of interest" is used here to designate a matrix of nine-by-nine bits which is being used at any given moment in the image enhancement process.

The Bit Memory Register 40, or BMR2, will provide an output over bus 27 to the summing device 28, which may be a four bit binary full adder such as an SN74283. In the summing device 28, the output from 40 embodying data for the oldest pixel from the last prior matrix will be subtracted from the value of the most recent pixel over bus 24, which is part of the new matrix of interest, to provide new values over bus 42 representing any change in brightness between the old pixel which is being deleted and the new pixel which is being added.

In summing device 44, which may comprise a pair of SN74283's, the current value appearing on bus 42 will be summed with the present row value recorded in the Row Memory Register 56. This present row value will be supplied from Row Memory 48 over bus 54 into the Row Memory Register 56 from which it will be routed over bus 57 for processing in summers at 44 and 58. In bus 44 it will be used to generate a new value representing a change in brightness for entry over bus 46 to the Row Memory.

Assuming the system has been operating for a long enough period to accumulate data for at least one $9 \times 9$ matrix, the Row Memory 48 will now contain binary values which represent the sums of nine consecutive columns of that row data. In an embodiment employing an 81 element scanner, as suggested above, the row memory 48 will contain 85 locations which represent the sums of nine consecutive rows of data for each of 85 rows. (The rationale for the additional four rows of data, which are rows of zeros, will be explained below.)

Upon leaving the Row Memory 48, the results are transferred via the Row Memory Register 56 to the Row Memory Shift Register 60 which accumulates data respecting the brightness of the last nine consecutive rows. The last nine consecutive row values are the final link in the construction of the nine-by-nine matrix. The oldest value coming out of the RMSR 60 is subtracted in summer 58 from the value supplied from the output of RMR 56. The result is transferred over bus 62 and via a row memory shift register 63 to the summer 64 where it is summed with an older value from the Area Register 68. The result is then applied over bus 66 to be added to the existing area in Area Register 68. The value of the area of the matrix is then transmitted over lines at 70 to the comparator at 74 for comparison with the scaled value of the center pixel of the same matrix of interest.

As indicated previously, the actual number of rows of video is 81, but an additional four rows of zeros, for a total of 85 rows, are introduced to insure the separation of the bottom of the scan from the top as the video signals roll over. If there were no additional rows of zeros, as the bottom of the scan is approached the reference area would start to include data from the top of the scan. This would result in a misjoinder of the reference area with signals which are not properly associated with the central pixel of interest. Introducing the four rows of zeros in effect provides a space between the top and bottom of the scan such that the matrix, now coming out of the bottom and going into the top of the scan, includes extra rows of zeros making it possible to scale the center pixel according to the number of active rows summed in the area register.

To provide the correction referred to above, in the present application, the data is scaled by 45, 54, 63, 72 or 81, all factors of nine. The center pixel for the top and bottom five rows of pixels of the scan plus four rows of zeros is effectively multiplied by 45 because the active reference area is five rows high (+four rows of zeros) and nine columns wide. The second center pixel from the top or bottom is multiplied by 54 because the active reference area is six rows high (plus three rows of zeros) and nine columns wide. In a similar fashion the third and fourth center pixels from the top or bottom are multiplied by 63 and 72 respectively. All other center pixels are multiplied by 81, since they are at the center of a full matrix of nine rows and nine columns. Scaling is achieved by addressing a read only memory 76 with the appropriate center pixel and with the output of the row memory address counter 49 which establishes the position of the pixel in the scan. The contents addressed in the ROM 76 represent the appropriate product.

All the memories are cleared and the area register is preset to a constant value during initialization (typically between documents). The constant in the area register serves to enhance the video by forcing the reflectance of the area to seem darker than it actually is. This is especially useful when smudges or noise are present on documents.

Figure 2:
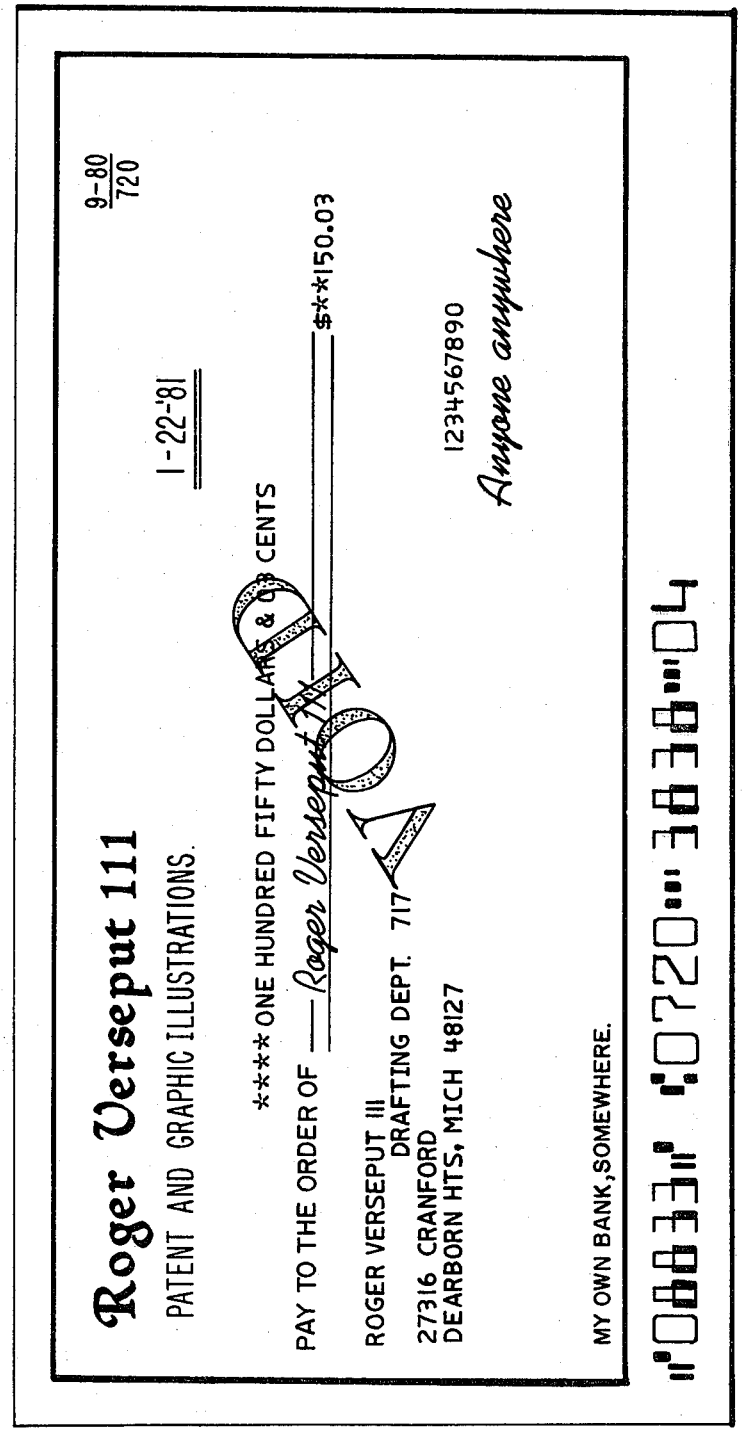
FIG. 2 is an illustration of an exemplary document of a kind which may be read with the optical character readers to which this invention relates.

The foregoing system may be applied to scanning data in a number of possible situations. In a particular case it has been applied to scanning the E13B characters employed on checks and the like, as illustrated along the lower portions of FIG. 2. As scanning is completed, readouts from terminal 78 of FIG. 1 are fed to a character reading apparatus (not shown) which interprets the signals and enables character print-outs such as are indicated in FIG. 3.

What is claimed is:

1. In an image enhancement device providing digital video signals representing pixels of a character, means for enhancing said digital video signals, comprising:
   memory means coupled to receive and store said digital video signals, where a group of signals represents the reflectance of a pixel;
   groups of said signals including active groups of signals and inactive groups of signals where the active groups represent active pixels from areas containing characters and the inactive groups represent inactive pixels corresponding to blank spaces without characters, said inactive groups of signals being formed solely as groups of zeros;
   means coupled to said memory means to extract digital video signals representing the reflectance of the central pixel in a given matrix of pixels to provide a central value;
   summing means coupled to sum active signals representing the reflectances of all the active pixels in said given matrix to provide a matrix value;
   means coupled to receive and scale the central value in accordance with the number of active pixels in the matrix to provide a scaled value; and
   means for comparing said scaled value with said matrix value and generating a binary video output which is maximized when said scaled value is greater than said matrix value and minimized when said scaled value is less than said matrix value.

2. The invention as claimed in claim 1, in which the summing means coupled to sum signals representing reflectances of all the pixels in said given matrix to provide a matrix value comprises:
   a summing circuit coupled to receive a newest one of said groups of signals at the same time the newest one of said groups of signals is received by the memory;
   means for reading said memory to locate a group of signals representing the oldest pixel in the memory;
   means for routing said group of signals representing the oldest pixel to be summed in said summing circuit with the newest group of said signals in order to generate a new signal equal to the difference between the oldest and newest pixels; and
   means for summing a succession of said new signals to provide a summation signal representing the matrix value.

3. The invention as claimed in claim 1 or 2, in which the means to scale the central value comprises:
   a ROM coupled to receive and scale the central value by a factor of Y times X, where Y is the number of columns scanned and X is the number of rows of active pixels scanned, said quantity Y times X corresponding to the number of active pixels represented by the stored digital signals in the memory;
   whereby the central value is adjusted to an appropriate scaled value.

4. The invention as claimed in claim 3, in which:
   Y corresponds to 9, and
   X corresponds to 5, 6, 7, 8 or 9 rows of active pixels, whereby
   the scaling factor is 45, 54, 63, 72 or 81 depending upon the position of the central pixel relative to the matrix represented.

5. The invention as claimed in claim 1, in which:
   the summing means is coupled to sum the inactive signals representing the inactive pixels with the active signals to establish said matrix value.

6. In a character reader employing digital video signals representing characters on the face of a document, apparatus for enhancing the quality of the digital video signals, comprising:
   a memory coupled to receive and store a succession of groups of digital video signals in which each group of signals represents the reflectance of a pixel;
   said groups of signals including active groups of signals and inactive groups of signals where the active groups represent active pixels from areas containing characters and the inactive groups represent inactive pixels corresponding to blank spaces without characters, said inactive groups of signals being formed solely as groups of zeros;
   a summing circuit coupled to receive the newest one of said groups of digital video signals at the same time the signals are received by the memory;
   means for reading said memory to locate a group of signals representing the oldest pixel in an area of interest;
   means for routing said group of signals representing the oldest pixel to be summed in said summing circuit with the newest group of said signals in order to generate a new signal equal to the difference between the oldest and newest pixels,
   means for summing a succession of said new signals to provide a summation signal representing the total reflectance of pixels in the area of interest;
   means for reading said memory to locate and transmit a group of signals representing the central pixel in the area of interest;
   means for receiving and storing said group of signals representing the central pixel to provide a scaled signal corresponding in value to a value obtainable by multiplying said group by the total number of active pixels in the area of interest; and
   means for comparing the scaled signal with the summation signal and generating a binary video output signal having a maximum value when said scaled signal is greater than the summation signal and a minimum value when the scaled signal is less than the summation signal.

7. The invention as claimed in claim 6, in which:
the memory comprises a random access memory; and
the means for reading said memory includes a first address counter set to locate the oldest pixel in an area of interest corresponding to a selected address in the memory and a second address counter set to locate the central pixel in an area of interest corresponding to a selected address in the memory.

8. A method for enhancing digital video signals representing characters on the face of a document, comprising:
storing a succession of groups of digital video signals in a memory in which each group of signals represents the reflectance of a pixel;
said groups of signals including active groups of signals and inactive groups of signals where the active groups represent active pixels from areas containing characters and the inactive groups represent inactive pixels corresponding to blank spaces without characters, said inactive groups of signals being formed solely as groups of zeros;
extracting a group of signals representing the oldest pixel in the memory;
summing the most recent of said groups of digital video signals with the oldest pixel from the memory to generate a new signal;
summing a succession of the new signals to provide a summation signal representing the total reflectance of pixels forming a matrix area of interest in the memory;
extracting a group of signals representing the central pixel in the matrix area of interest;
scaling the group of signals representing the central pixel to provide scaled signals corresponding to signals generated by multiplying said group by the total number of active pixels in the matrix area of interest; and
comparing the scaled signal with the summation signal to provide a maximum output when said scaled signal is greater than the summation signal and a minimum output when the scaled signal is less than the summation signal.

9. The invention as claimed in claim 8, in which:
storing the inactive groups of signals comprises placing a succession of groups of digital signals representing rows of zeros in the memory;
said rows of zeros represent spaces between the top and bottom edges of a video scan of characters in the face of a document and are useable to separate signals generated during roll-over between the top and bottom of the face of a document; whereby
the scaled signals are free of false indications which would be generated by mixing signals from the bottom and the top.

* * * * *